(12) United States Patent
Kunitake (10) Patent No.: US 8,722,267 B2
(45) Date of Patent: May 13, 2014

(54) FUEL CELL TERMINAL PLATE, METHOD FOR MANUFACTURING THE PLATE, AND FUEL CELL INCORPORATING THE PLATE

(75) Inventor: Kazuhisa Kunitake, Numazu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 627 days.

(21) Appl. No.: 12/746,185

(22) PCT Filed: Oct. 15, 2008

(86) PCT No.: PCT/IB2008/002721
§ 371 (c)(1),
(2), (4) Date: Jun. 4, 2010

(87) PCT Pub. No.: WO2009/071968
PCT Pub. Date: Jun. 11, 2009

(65) Prior Publication Data
US 2010/0273076 A1    Oct. 28, 2010

(30) Foreign Application Priority Data
Dec. 7, 2007  (JP) ................................ 2007-316853

(51) Int. Cl.
*H01M 8/24*   (2006.01)
*H01M 8/02*   (2006.01)
*H01M 8/04*   (2006.01)

(52) U.S. Cl.
USPC ........................... 429/434; 429/452; 429/517

(58) Field of Classification Search
USPC .......... 429/452–471, 507–511, 517–522, 535
See application file for complete search history.

(56) References Cited

U.S. PATENT DOCUMENTS

| | | |
|---|---|---|
| 2004/0110058 A1 | 6/2004 | Lee et al. |
| 2004/0137299 A1 | 7/2004 | Mazza et al. |
| 2004/0151952 A1 | 8/2004 | Brady et al. |
| 2006/0115703 A1 | 6/2006 | Kubota et al. |
| 2007/0007141 A1 | 1/2007 | Maeda et al. |

FOREIGN PATENT DOCUMENTS

| | | |
|---|---|---|
| DE | 10 2006 029 511 | 1/2007 |
| EP | 1 437 782 A1 | 7/2004 |
| JP | 2001-345109 | 12/2001 |
| JP | 2003-338296 | 11/2003 |
| JP | 2004-71321 | 3/2004 |
| JP | 2005-32594 | 2/2005 |
| JP | 2007-146250 | 6/2007 |
| WO | WO 2004/015792 A | 2/2004 |

OTHER PUBLICATIONS

International Search Report in International Application No. PCT/IB2008/002721 (Mar. 10, 2001), pp. 1-3.

*Primary Examiner* — Basia Ridley
*Assistant Examiner* — Caitlin Wilmot
(74) *Attorney, Agent, or Firm* — Finnegan, Henderson, Farabow, Garrett & Dunner, LLP (57) ABSTRACT

A front terminal plate (31) that is joined to a fuel cell unit (40) at the front end of a fuel cell stack has a metal-plating layer (31b) formed on the side to be joined to the fuel cell unit (40). The metal-plating layer (31b) is formed so as to cover the surface of a plate (31a), and the surface of the metal-plating layer (31b) is flat. The thickness of the metal-plating layer (31b) in an electrode-facing region (31c) that faces an electrode region of the fuel cell unit (40) is different from the thickness of the metal-plating layer (31b) in a peripheral region (31d) that surrounds the electrode-facing region (31c), and the thickness of the metal-plating layer (31b) in the peripheral region (31d) is larger than the thickness of the metal-plating layer (31b) in the electrode-facing region (31c).

8 Claims, 9 Drawing Sheets

FUEL CELL TERMINAL PLATE, METHOD FOR MANUFACTURING THE PLATE, AND FUEL CELL INCORPORATING THE PLATE

CROSS-REFERENCE TO RELATED APPLICATIONS

This application is a national phase of International Application No. PCT/IB2008/002721, filed Oct. 15, 2008, and claims the priority of Japanese Application No. 2007-316853, filed Dec. 7, 2007, the contents of both of which are incorporated herein by reference.

BACKGROUND OF THE INVENTION

1. Field of the Invention

The invention relates to a fuel cell terminal plate that is used to collect power generated by a fuel cell through electrochemical reaction between hydrogen and oxygen, a method for manufacturing the plate, and a fuel cell incorporating the plate.

2. Description of the Related Art

Water is inevitably produced as power is generated through electrochemical reaction between hydrogen and oxygen at a fuel cell. In the case of a solid-electrolyte membrane type fuel cell, because the electrolyte membrane needs to be kept moistened, fuel gas is often supplied to the fuel cell together with water vapor. Further, in order to maintain the temperature of the fuel cell at a suitable temperature for the electrochemical reaction, coolant is circulated through the fuel cell. Thus, in each fuel cell unit as a power generation element of the fuel cell, separators that partition the fuel cell from the adjacent fuel cell units may contact, under the electric potential produced by the power generation of the fuel cell being applied thereto, the water produced by electrochemical reactions and the water contained in the gases. Therefore, the separators need to have both a high corrosion resistance and a low contact resistance. Further, the separators need to have a high corrosion resistance against corrosive elements dissolved in the produced water and the water in the gases, apart from the contact resistance against water under the electric potential mentioned above being applied. For these reasons, the surface of the separator of the fuel cell described in the Japanese Patent Application Publication No. 2001-345109 (JP-A-2001-345109) is applied with a gold-plating layer that has both high corrosion resistance and a low contact resistance.

The power generated by each fuel cell unit is collected via conductive terminal plates provided at the both ends of the fuel cell stack, which is constituted of a plurality of fuel cell units stacked on top of each other, and then outputted. Because the terminal plates collect power generated while serving also as portions via which fuel gases and coolant are distributed to and discharged from the respective fuel cell units, the corrosion resistance of the terminal plates needs to be as high as that of the separators, and the contact resistance of the terminal plates needs to be as low as that of the separators.

Used to collect the generated power, the terminal plates are exposed in a large electric potential difference, they require different measures from those for the separators. For example, in order to prevent the terminal plates from contacting the water in the gases distributed to and discharged from the respective fuel cell units and the coolant, conductive sealing plates are provided between the fuel cell units at the ends of the fuel cell stack and the respective terminal plates. Although the use of such sealing plates increases the contact resistance and thus slightly reduces the power output of the fuel cell stack, a higher priority is often given to secure a high corrosion resistance. For example, a high corrosion resistance and a low contact resistance of each terminal plate can be achieved by plating the entire surface of each terminal plate with gold. In this case, however, because gold is precious, the amount of gold used for such plating needs to be saved.

SUMMARY OF THE INVENTION

The invention provides technologies related to a terminal plate having a layer that has a low electric resistance and a high corrosion resistance (e.g., gold-plating layer) and that can be formed of a less amount of material being used for the layer.

The first aspect of the invention relates to a terminal plate joined to a fuel cell, that generates power through electrochemical reaction between hydrogen and oxygen, to collect the power generated by the fuel cell. This terminal plate has: a conductive plate; and a layer, that has a low electric resistance and a high corrosion resistance, is formed on a surface of the plate via which the plate is joined to the fuel cell. The surface of the layer is flat. The thickness of the layer in an electrode-facing region that faces an electrode region of the fuel cell is different from the thickness of the layer in a peripheral region that surrounds the electrode-facing region, and the thickness of the layer in the peripheral region is larger than the thickness of the layer in the electrode-facing region.

The above-described terminal plate may be such that the thickness of the plate in the electrode-facing region and the thickness of the plate in the peripheral region are different and the thickness of the plate in the peripheral region is smaller than the thickness of the plate in the electrode-facing region.

The above-described terminal plate may be such that the thickness of the layer is set according to the thickness of the plate so as to make the thickness of the terminal plate uniform.

The above-described terminal plate may be such that the thickness of the layer in the electrode-facing region is approximately 0.5 to 4 μm and the thickness of the layer in the peripheral region is approximately 5 to 15 μm.

The above-described terminal plate is joined to the fuel cell via the layer formed on the plate. The surface of the layer is flat and the layer has a low electric resistance and a high corrosion resistance. The layer may be easily formed by gold plating, for example. The thickness of the layer is not uniform. That is, the thickness of the layer in the electrode-facing region facing the electrode region of the fuel cell is different form the thickness of the layer in the peripheral region surrounding the electrode-facing region. The thickness of the layer in the peripheral region is larger than the thickness of the layer in the electrode-facing region.

Although the layer in the electrode-facing region is in contact with the fuel cell, the fuel gases and the coolant distributed to and discharged from the fuel cell do not directly contact the layer in the electrode-facing region. Therefore, although the layer in the electrode-facing region is required to reduce the contact resistance between the terminal plate and the fuel cell, it is not required to have a high corrosion resistance, that is, it does not need to be made thick. As such, even if the layer is thin in the electrode-facing region, it does not cause any problem as long as the contact resistance can be reduced sufficiently.

On the other hand, in the peripheral region surrounding the electrode-facing region, the terminal plate serves also as part of the passages of the fuel gases and coolant distributed to and discharged from the fuel cell, and therefore the water contained in the gases, the coolant, and the corrosive components contained in them may contact the surface of the terminal plate. Therefore, the thickness of the layer in the peripheral region is made thick to achieve both a high corrosion resistance and a low contact resistance. This reduces the amount of material needed for forming the layer as compared to when the layer is formed with a uniform thickness.

For example, the above-described terminal plate may be formed as follows. First, the plate is formed such that the thickness of the plate in the electrode-facing region and the thickness of the plate in the peripheral region are different and the thickness of the plate in the peripheral region is smaller than the thickness of the plate at the electrode-facing region. In this manner, the smaller the thickness of the plate in the peripheral region, the larger the thickness of the layer in the peripheral region can be made. That is, first, a layer is formed in the peripheral region where the thickness of the plate is small (e.g., the layer is formed by gold plating), and then a thin layer is formed on the surface of the layer in the peripheral region and the surface of the plate in the electrode-facing region. In this way, a layer having a flat surface and having a thickness that is large in the peripheral region and small in the electrode-facing region is obtained.

The above-described terminal plate may be such that openings through which fuel gas and coolant are distributed to and discharged from the fuel cell unit are formed in the peripheral region of the plate with the layer formed thereon and the thickness of the layer is large only at opening-surrounding regions surrounding the respective openings.

The above-described terminal plate may be such that the thickness of the layer in the peripheral region excluding the opening-surrounding regions and the thickness of the layer in the electrode-facing region are equal to each other.

In a case where openings through which fuel gas and coolant are distributed to and discharged from the fuel cell are formed in the peripheral region of the plate with the layer formed thereon, the layer may be formed such that the thickness of the layer is large only at the opening-surrounding regions surrounding the respective openings. According to this structure, the thickness of the layer is made thick at the opening-surrounding regions that contact the water contained in the fuel gases and the coolant distributed to and discharged from the fuel cell, achieving a high corrosion resistance at the opening-surrounding regions. This further reduces the amount of material needed for forming the layer while achieving both a low contact resistance and a high corrosion resistance.

The above-described terminal plate may be such that the layer is formed by gold-plating.

The above-described terminal plate may be such that the fuel cell unit is of a dead-end type, the terminal plates are provided at both ends of the fuel cell unit, and the difference in the thickness of the layer is formed on only one of the terminal plates.

The second aspect of the invention relates to a method for manufacturing the terminal plate according to the first aspect of the invention. This method includes: forming the plate such that the thickness of the plate is smaller in the peripheral region than in the electrode-facing region; forming a layer in the peripheral region and forming a layer in the peripheral region and the electrode-facing region.

The above-described terminal plate may be used in a fuel cell unit structured as described below.

The third aspect of the invention relates to a fuel cell having: a fuel cell stack constituted of a plurality of fuel cell units, that generate power through electrochemical reaction between hydrogen and oxygen, stacked on top of each other; terminal plates, that are joined to the fuel cell units at both ends of the fuel cell stack respectively, to collect power generated by the fuel cell stack; and a clamping mechanism that clamps the fuel cell stack and the terminal plates together between a pair of end plates facing each other. Each terminal plate has a conductive plate and a layer, that has a low electric resistance and a high corrosion resistance and is formed on a surface of the plate via which the plate is joined to the fuel cell, and the surface of the layer is flat. The thickness of the layer in an electrode-facing region that faces an electrode region of the fuel cell is different form the thickness of the layer in a peripheral region that surrounds the electrode-facing region, and the thickness of the layer in the peripheral region is larger than the thickness of the layer in the electrode-facing region.

According to the fuel cell described above, because the terminal plates at the ends of the fuel cell stack are adapted to provide a low contact resistance and a high corrosion resistance when they are jointed to the fuel cell units, any conductive sealing plate does not need to be provided between the ends of the fuel cell stack and the fuel cell units. Thus, the amount of power that the fuel cell can generate from given amounts of fuel gases can be maintained or increased. Further, the aforementioned structure of the fuel cell requires small amount of material for forming the layer and this reduces the cost thereof. Further, the corrosion resistance obtained by the terminal plate extends the life of the fuel cell. As such, when the fuel cell is used in a vehicle as a power source for propelling the vehicle, the fuel cell can be easily serviced for maintenance.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EMBODIMENTS

Figure 1:
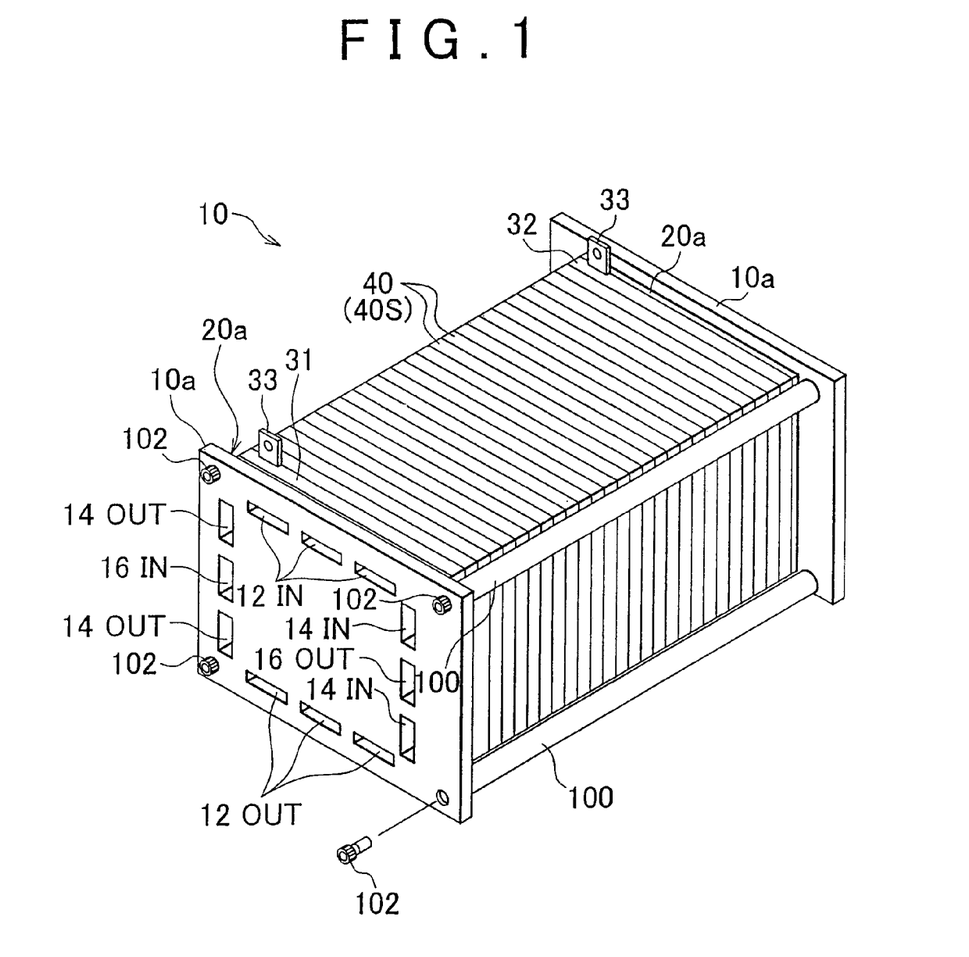
FIG. 1 is a view schematically showing the structure of a fuel cell according to the first example embodiment of the invention.

FIG. 1 is a view schematically showing the structure of a fuel cell 10 according to the first example embodiment of the invention. Referring to FIG. 1, the fuel cell 10 incorporates a stack of a plurality of fuel cell units 40, that generate power through electrochemical reaction between hydrogen and oxygen, are stacked on top of each other between a pair of end plates 10a. Hereinafter, the stack of the fuel cell units 40 will be referred to as "fuel cell stack 40S". Each fuel cell unit 40 has a membrane-electrode assembly constituted of an electrolyte membrane having a proton conductivity, an anode provided on one side of the electrolyte membrane, and a cathode provided on the other side of the electrolyte membrane, and separators sandwiching the membrane-electrode assembly. The anode and the cathode are each constituted of a catalyst layer provided on the surface of the electrolyte membrane and a gas diffusion layer provided on the catalyst layer. In the first example embodiment of the invention, a solid-electrolyte membrane, such as Nafion (registered trademark), is used as the electrolyte membrane. Passages for hydrogen (fuel gas) to be supplied to the anode, passages for air (oxidizing gas) to be supplied to the cathode, and passages for coolant are formed in the separators. The number of the fuel cell units 40 of the fuel cell stack 40S can be set according to the output power required for the fuel cell 10.

An insulation plate 20a and a front terminal plate 31 are sandwiched between the front end of the fuel cell stack 40S and a front end plate 10a and another insulation plate 20a and a rear terminal plate 32 are sandwiched between the rear end of the fuel cell stack 40S and the rear end plate 10a. Air inlets 12IN, air outlets 12OUT, hydrogen inlets 14IN, hydrogen outlets 14OUT, a coolant inlet 16IN, and a coolant outlet 16OUT are formed on all the front end plate 10a, the insulation plate 20a and the front terminal plate 31. Inlet manifolds for distributing hydrogen, air, and coolant to each fuel cell unit 40 (a hydrogen inlet manifold, an air inlet manifold, and a coolant inlet manifold), outlet manifolds for collecting the off-gases discharged from the cathode and anode of each fuel cell unit 40 and the coolant and discharging them to the outside of the fuel cell 10 (a cathode-off-gas outlet manifold, an anode-off-gas outlet manifold, and a coolant outlet manifold) are formed through the respective fuel cell units 40. Note that these inlet and outlet manifolds are not shown in the drawings.

For achieving a high rigidity, the end plates 10a are made of metal (e.g., copper). The insulation plates 20a are formed of an insulative material (e.g., rubber, resin). The front terminal plate 31 and the rear terminal plate 32 are made of a conductive and gas-impermeable material (e.g., dense carbon, copper plate) having gold-plating layers formed on the surfaces thereof as will be described in detail later.

The fuel cell 10 has clamping shafts 100 extending beside the fuel cell stack 40S between the end plates 10a facing each other. The clamping shafts 100 are in contact with and fastened to the end plates 10a by bolts 102, thereby clamping the fuel cell stack 40S between the end plates 10a facing each other.

Hydrogen (fuel gas) is supplied to the anode of each fuel cell unit 40 of the fuel cell stack 40S via the hydrogen inlets 14IN, and air is supplied to the cathode via the air inlets 12IN, whereby the fuel cell units 40 generate power through electrochemical reaction between hydrogen and oxygen.

Figure 2:
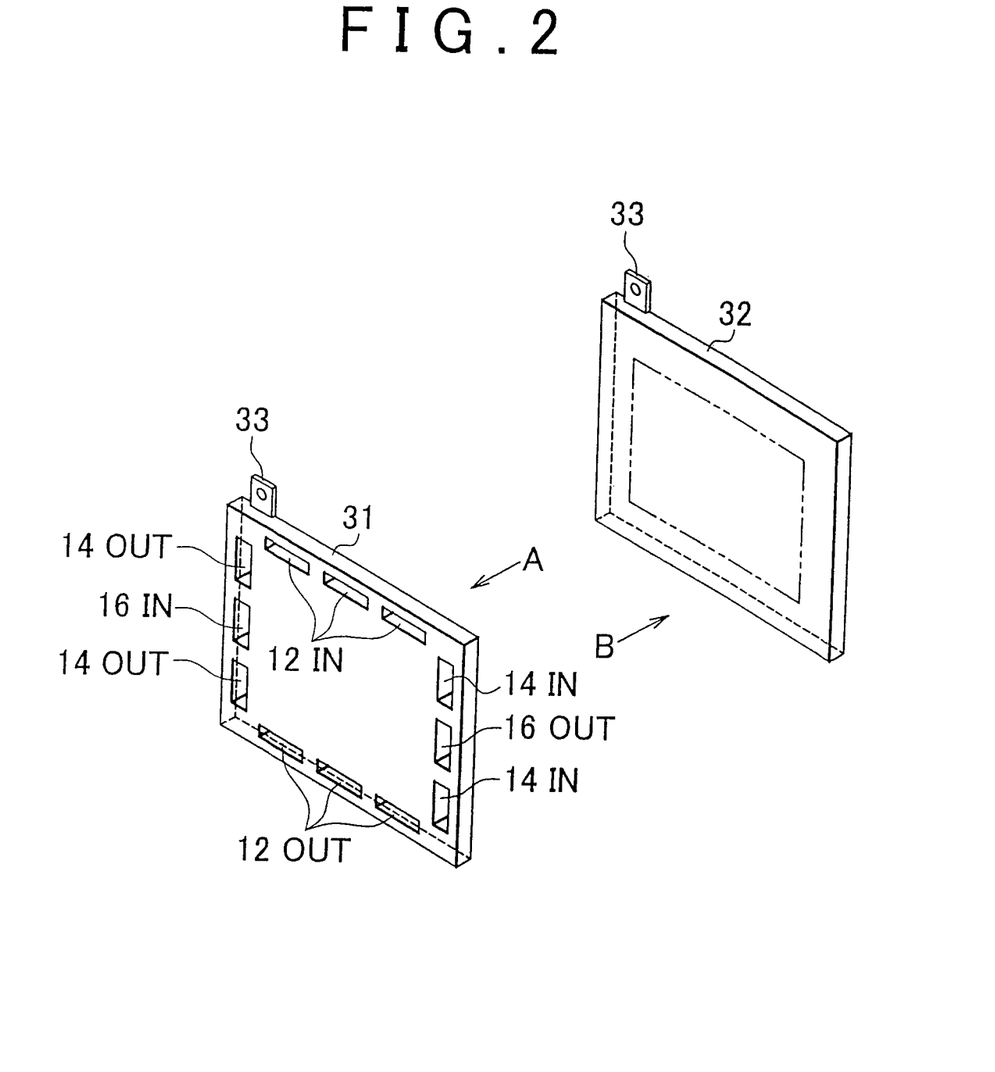
FIG. 2 is a view schematically illustrating a front terminal plate and a rear terminal nplate installed in a fuel cell.
Figure 3:
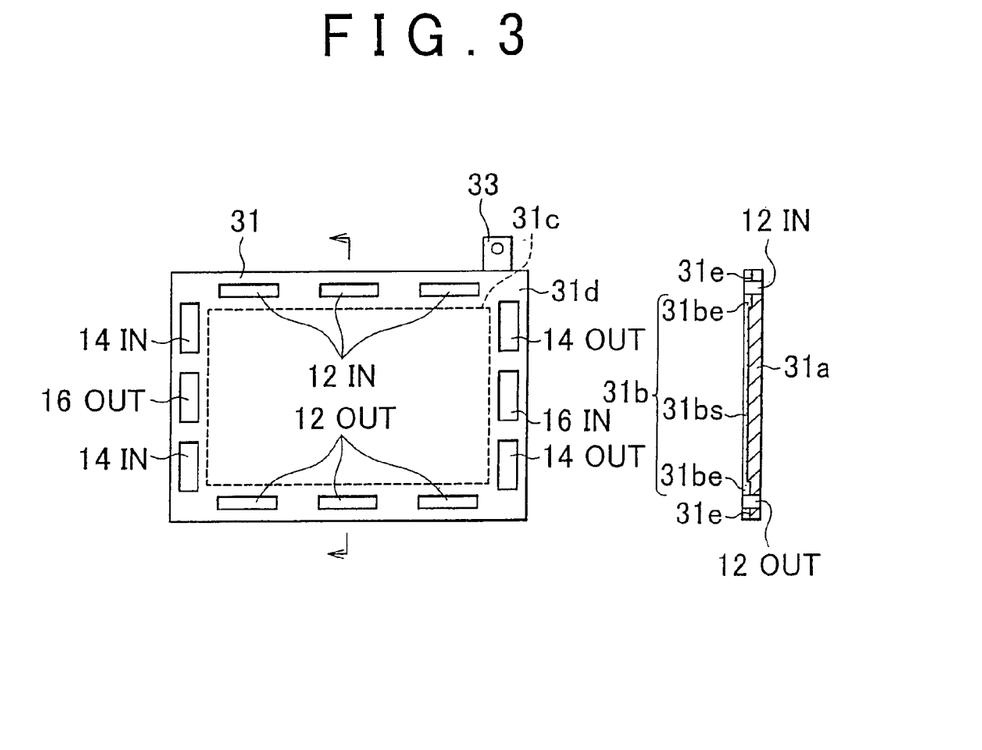
FIG. 3 is a view of the front terminal plate seen in the direction A indicated in FIG. 2 and a cross-sectional view of the front terminal plate taken in the direction A.
Figure 4:
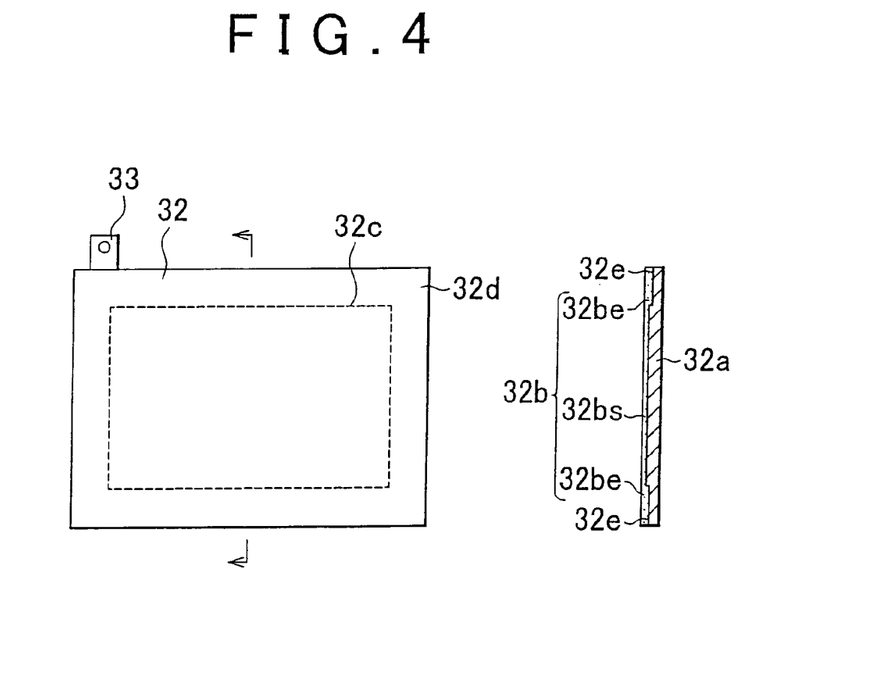
FIG. 4 is a view of the rear terminal plate seen in the direction B indicated in FIG. 2 and a cross-sectional view of the rear terminal plate taken in the direction B.

Next, the front terminal plate 31 and the rear terminal plate 32 will be described in detail. FIG. 2 is a view schematically illustrating the front terminal plate 31 and the rear terminal plate 32 installed in the fuel cell 10. FIG. 3 includes a view of the front terminal plate 31 seen in the direction A indicated in FIG. 2 and. a cross-sectional view of the front terminal plate 31 taken in the direction A. FIG. 4 includes a view of the rear terminal plate 32 seen in the direction B indicated in FIG. 2 and a cross-sectional view of the rear terminal plate 32 taken in the direction B.

Referring to FIG. 3 and FIG. 4, the front terminal plate 31 has openings of the air inlets 12IN and so on, as the front end plate 10a has, for distributing and discharging air, hydrogen, coolant, while the rear terminal plate 32 has none of such openings. That is, the fuel cell 10 is structured as a so-called "dead-end type" fuel cell unit in which air and hydrogen are distributed to the respective fuel cell units 40 via the front end plate 10a and the surplus hydrogen and air, the anode-off gas, and the cathode-off gas turn around at the rearmost fuel cell unit 40 joined to the rear terminal plate 32 (i.e., at the separator of the rearmost fuel cell unit 40) and return to the front end plate 10a. Likewise, coolant is distributed to the respective fuel cell units 40 via the front end plate 10a and then turns around and return to the front end plate 10a.

As such, although only the front terminal plate 31 has the openings of the air inlets 12IN and so on, while the rear terminal plate 32 does not, both the front terminal plate 31 and the rear terminal plate 32 are joined to the fuel cell unit 40 at the front end of the fuel cell stack 40S and to the fuel cell unit 40 at the rear end of the fuel cell stack 40S, respectively, and they both output the power generated by the respective fuel cell units 40 via output terminals 33. The front terminal plate 31 and the rear terminal plate 32 have plates 31a, 32a made of the aforementioned conductive material and gold-plating layers 31b, 32b provided on the plates 31a, 32a respectively as shown in the cross-sectional views of the FIG. 3 and FIG. 4. The gold-plating layers 31b, 32b are flat and cover the surfaces of the plates 31a, 32a, respectively. The gold-plating layers 31b, 32b have a low electric resistance and a high corrosion resistance. The gold-plating layer 31b of the front terminal plate 31 contacts the fuel cell unit 40 at the front end of the fuel cell stack 40S, and the gold-plating layer 32b of the rear terminal plate 32 contacts the fuel cell unit 40 at the rear end of the fuel cell stack 40S.

Although the surface of the gold-plating layer 31b is flat, the thickness of the gold-plating layer 31b in an electrode-facing region 31c facing the electrode region of the corresponding fuel cell unit 40 is different from the thickness of the gold-plating layer 31b in a peripheral region 31d surrounding the electrode-facing region 31c. Likewise, although the surface of the gold-plating layer 32b is flat, the thickness of the gold-plating layer 32b in an electrode-facing region 32c facing the electrode region of the corresponding fuel cell unit 40 is provided is different from the thickness of the gold-plating layer 32b in a peripheral region 32d surrounding the electrode-facing region 32c. That is, the gold-plating layer 31b of the front terminal plate 31 is composed of a center plating layer 31bs having a small thickness and formed in the electrode-facing region 31c and a peripheral plating layer 31be having a large thickness and formed in the peripheral region 31d. In the first example embodiment of the invention, the thicknesses of the center plating layers 31bs, 32bs are approximately 0.5 to 4 μm and the thicknesses of the peripheral plating layers 31be, 32be are approximately 5 to 15 μm.

Figure 5:
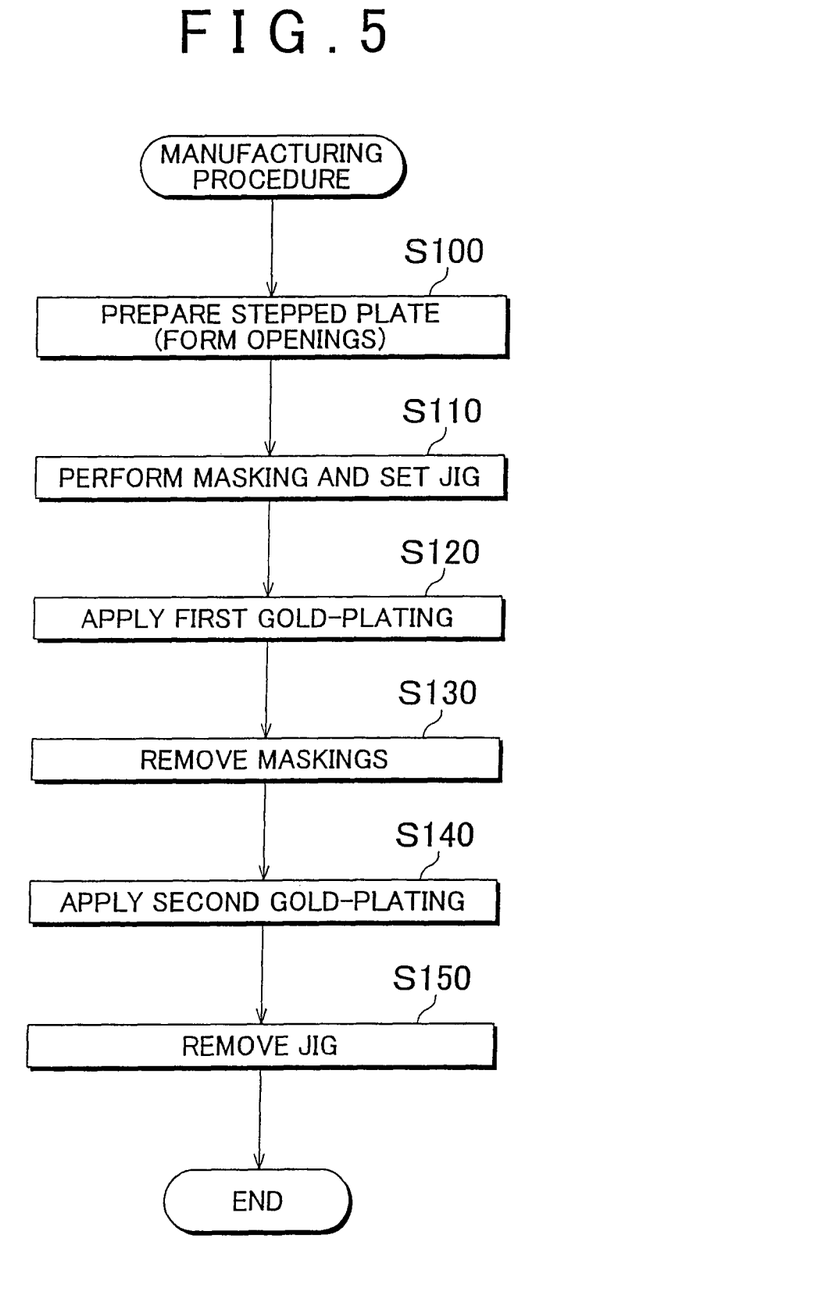
FIG. 5 is a chart illustrating a procedure for manufacturing the front terminal plate and the rear terminal plate each having a gold-plating layer having a non-uniform thickness.
Figure 6:
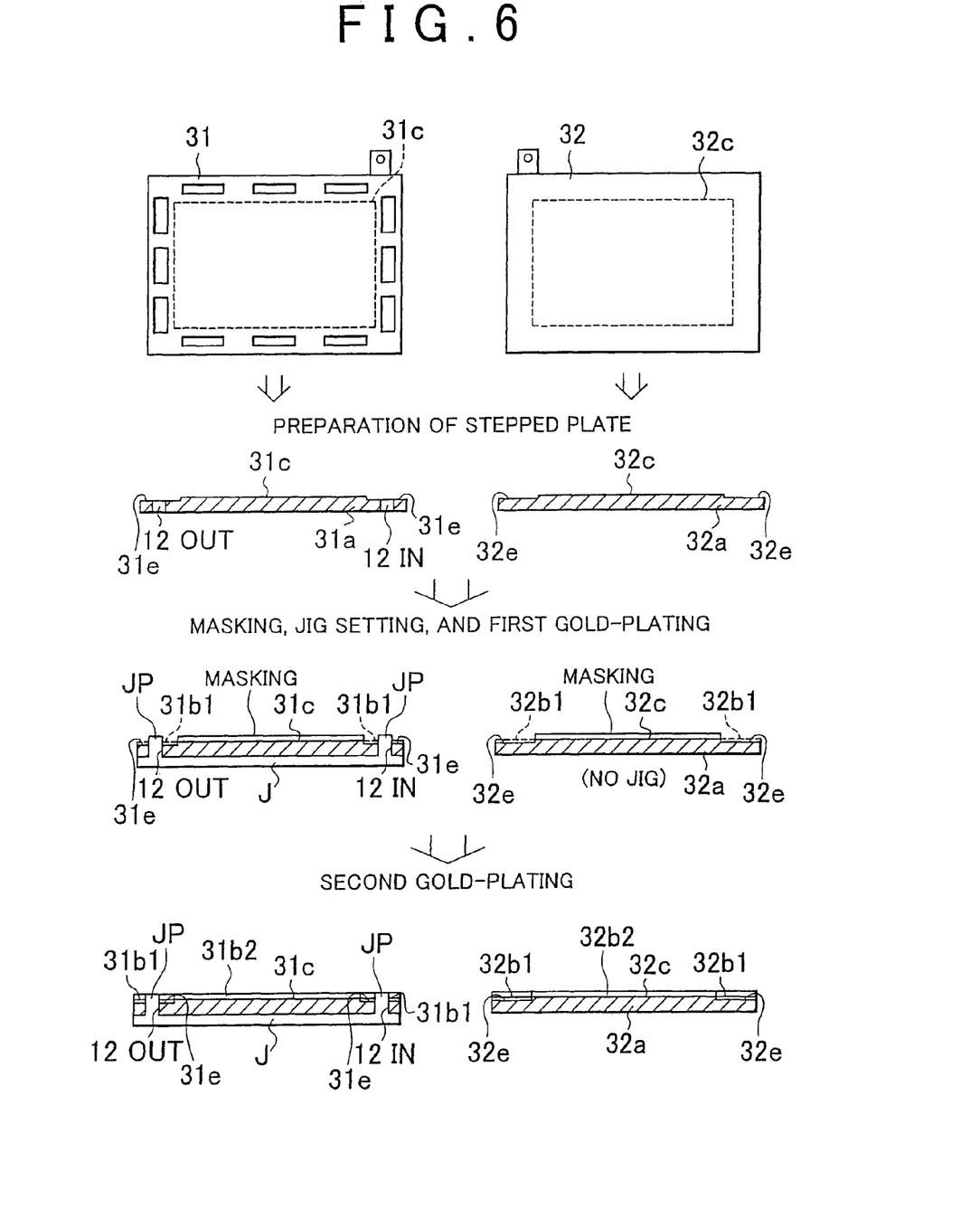
FIG. 6 is a view illustrating manufacturing process performed in the manufacturing procedure.

The chart of FIG. 5 illustrates a procedure for manufacturing the front terminal plate 31 and the rear terminal plate 32 each having the gold-plating layer having the non-uniform thickness described above. FIG. 6 is a view illustrating manufacturing process performed in the manufacturing procedure.

Figure 7:
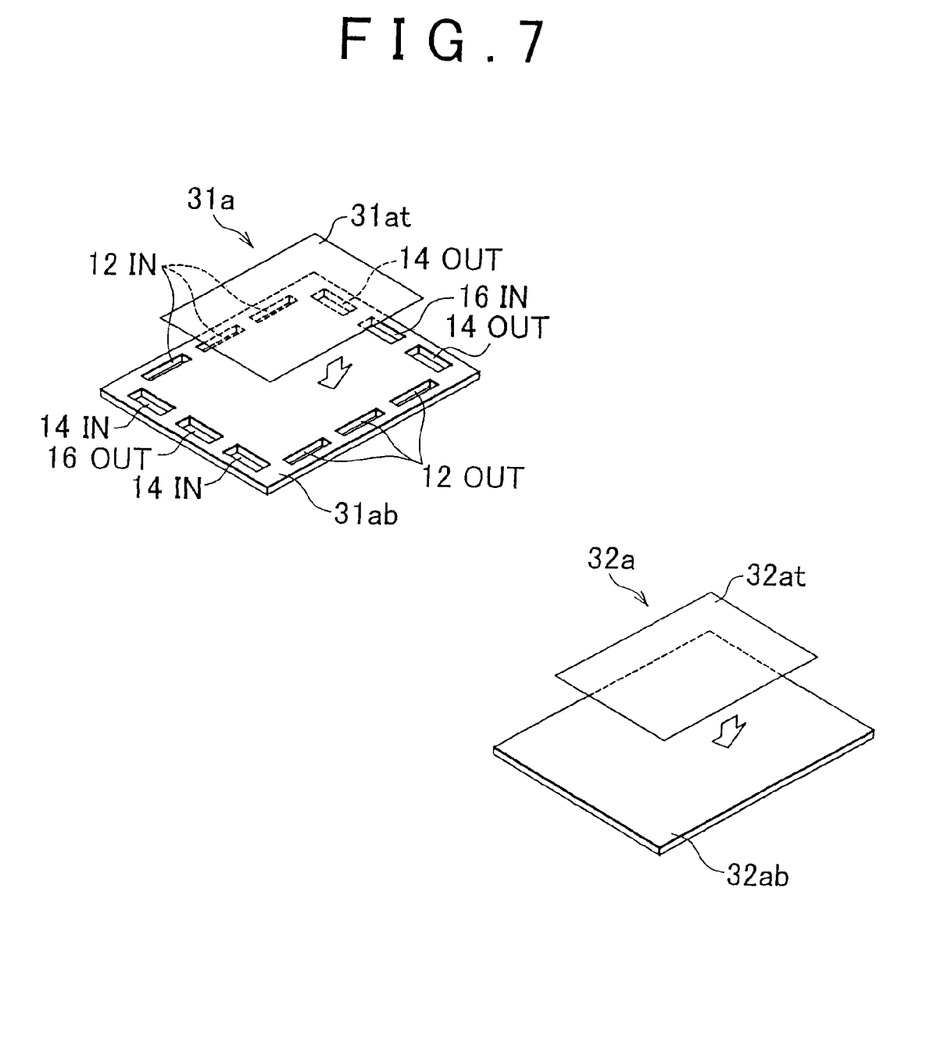
FIG. 7 is a view illustrating an exemplary process that is performed in the manufacturing procedure to prepare plates.

FIG. 7 is a view illustrating an exemplary process that is performed in the manufacturing procedure to prepare plates.

Referring to FIG. 5, when manufacturing the front terminal plate 31 and the rear terminal plate 32, plates 31a, 32a having stepped portions 31e, 32e formed at the peripheries of the front terminal plate 31 and the rear terminal plate 32, respectively, are first prepared (step S100). Note that the openings of the air inlets 12IN, the air outlets 12OUT, and so on are formed in the stepped portion 31e of the plate 31a in advance. The stepped portion 31e is formed by, for example, cutting or pressing the periphery of the plate 31a that is a flat plate. Alternatively, as shown in FIG. 7, a thin plate 31at may be provided on a flat plate 31ab such that the stepped portion 31e is formed at the periphery of the thin plate 31at. Note that the plate 32a may be formed in the same manner as the plate 31a.

Then, the center regions of the plates 31a, 32a, that is, the electrode-facing region 31c of the plate 31a and the electrode-facing region 32c of the. plate 32a are masked and then a jig J is set to the plate 31a (step S110). The jig J has projections JP formed in shapes corresponding to shapes of the openings of the air inlets 12IN, the air outlets 12OUT, and so on, at the plate 31a. Therefore, when the plate 31a is set on the jig J, the projections JP fill up the openings and protrude from the surface of the plate 31a. That is, the projections JP of the jig J are provided to form openings of the air inlets 12IN, the air outlets 12OUT, and so on at the gold-plating layer that is formed by the gold-plating process described later. The jig J is made of resin, therefore gold is not plated on the jig J in the gold-plating process.

After masking the plates 31a, 32a and setting the jig J to the plate 31a as described above, first gold-plating is applied to the plates 31a, 32a (step S120), whereby first gold-plating layers 31b1, 32b1 are formed on the stepped portion 31e of the plate 31a and the stepped portion 32e of the plate 32a, respectively. In this case, the first gold-plating layers 31b1, 32b1 are formed in such thicknesses that the first gold-plating layers 31b1, 32b1 fill up the steps 31e, 32e, respectively, and therefore the surfaces of the electrode-facing regions 31c, 32c under the maskings are substantially in level with the surfaces of the first gold-plating layers 31b1, 32b1. This gold-plating (first gold-plating) may be applied using a known method (e.g., dipping to a plating tank, electroless plating). During the gold-plating procedure, various process typically needed for plating, such as a defatting process, a cleansing process, a plated-surface activation process, a post-plating cleansing process, a drying process, and so on, are performed. The pretreatment process such as the defatting process and the plated-surface activation process may be performed prior to the masking.

Next, the maskings are removed from the plates 31a, 32a (step S130). Then, second gold-plating is applied to the plates 31a, 32a that have already been plated with gold by the first gold-plating as described above (step S140). As a result of the second gold-plating, second gold-plating layers 31b2, 32b2 are formed on the surfaces of the first gold-plating layers 31b1, 32b1, which have been formed on the steps 31e, 32e, respectively, and on the surfaces of the electrode-facing region 31c, 32c (i.e., on the entire surfaces of the plates 31a, 32a). Because the first gold-plating layers 31b1 and the electrode-facing region 31c are in level with each other and the first gold-plating layer 32b1 and the electrode-facing region 32c are in level with each other, the surfaces of the second gold-plating layers 31b2, 32b2 are flat. Thus, the first gold-plating layer 31b1 and the second gold-plating layer 31b2, which have been formed as described above, overlap each other at the periphery of the plate 31a of the front terminal plate 31, forming a peripheral plating layer 31be shown in FIG. 3, and the portion of the second gold-plating layer 31b2 on the electrode-facing region 31c forms a center plating layer 31bs. Likewise, the first gold-plating layer 32b1 and the second gold-plating layer 32b2, which have been formed as described above, overlap each other at the periphery of the plate 32a of the rear terminal plate 32, forming a peripheral plating layer 32be shown in FIG. 3, and the portion of the second gold-plating layer 32b2 on the electrode-facing region 32c forms a center plating layer 32bs. During the second gold-plating, too, the aforementioned process, as described for the first gold-plating, typically needed for plating is performed. Subsequently, the jig J is removed from the plate 31a of the front terminal plate 31 (step S150). This is the end of the procedure for manufacturing the front terminal plate 31 and the rear terminal plate 32. Thus, the front terminal plate 31 and the rear terminal plate 32 are obtained.

In the first example embodiment of the invention, as described above, the gold-plating layer 31b is formed on the surface of the front terminal plate 31 which contacts the fuel cell unit 40 at the front end of the fuel cell stack 40S to collect power, and the gold-plating layer 32b is formed on the surface of the rear terminal plate 32 which contacts the fuel cell unit 40 at the rear end of the fuel cell stack 40S to collect power. Further, when forming the gold-plating layer 31b on the plate 31a of the front terminal plate 31, the center plating layer 31bs is formed as a thin gold-plating layer that is approximately 0.5 to 4 μm in thickness and the peripheral plating layer 31be is formed as a thick gold-plating layer that is approximately 5 to 15 μm in thickness. Although the center plating layer 31bs is in contact with the fuel cell unit 40 at the front end of the fuel cell stack 40S, because each fuel cell unit 40 has the separators (not shown in the drawings), the gases and the coolant distributed to and discharged from the respective fuel cell units 40 do not directly contact the center plating layer 31bs. For this reason, even if the center plating layer 31bs is formed as a thin gold-plating layer having a thickness of approximately 0.5 to 4 82 m, the center plating layer 31bs provides a sufficient corrosion resistance while effectively reducing the contact resistance between the front terminal plate 31 and the fuel cell unit 40 at the front end of the fuel cell stack 40S. Likewise, when forming the gold-plating layer 32b on the plate 32a of the rear terminal plate 32, the center plating layer 32bs is formed as a thin gold-plating layer that is approximately 0.5 to 4 μm in thickness and the peripheral plating layer 32be is formed as a thick gold-plating layer that is approximately 5 to 15 μm in thickness. Although the center plating layer 32bs is in contact with the fuel cell unit 40 at the rear end of the fuel cell stack 40S, because each fuel cell unit 40 has the separators (not shown in the drawings), the gases and the coolant distributed to and discharged from the respective fuel cell units 40 do not directly contact the center plating layer 32bs. For this reason, even if the center plating layer 32bs is formed as a thin gold-plating layer having a thickness of approximately 0.5 to 4 μm, the center plating layer 32bs provides a sufficient corrosion resistance while effectively reducing the contact resistance between the rear terminal plate 32 and the fuel cell unit 40 at the rear end of the fuel cell stack 40S.

The peripheral region 31d of the front terminal plate 31 where the peripheral plating layer 31be is present serves as part of the passages of the fuel gases and the coolant distributed to and discharged from the respective fuel cell units 40. That is, the air inlets 12IN and so on are formed in the peripheral region 31d. Therefore, the water contained in the gases, the coolant, and various corrosive components contained in the gases and the coolant contact the peripheral plating layer 31be formed in the peripheral region 31d. In the first example embodiment of the invention, therefore, the peripheral plating layer 31be of the front terminal plate 31 is made thick to achieve a high corrosion resistance while reducing the contact resistance. This reduces the amount of gold needed for gold-plating as compared to when a gold-plating layer having a uniform thickness is formed on the terminal plate.

In the first example embodiment of the invention, further, the flat surfaces of the gold-plating layers 31b, 32b provide a high reliability in preventing leaks of the gases and the coolant from the joints between the terminal plates 31, 32 and the fuel cell units 40 when the fuel cell units 40 and the front and rear terminal plates 31, 32 are stacked.

In the first example embodiment of the invention, further, the center plating layer 31bs and the peripheral plating layer 31be, that are different in thickness, are formed while making the surface of the gold-plating layer 31b flat as follows. First, the stepped portion 31e is formed at the periphery of the plate 31a to make the electrode-facing region 31c and the peripheral region 31d surrounding the electrode-facing region 31c different in thickness. Then, the first-gold plating is applied to the stepped portion 31e so as to fill it up, and then the second gold-plating is applied to the entire surface of the plate 31a. As such, the surface of the gold-plating layer 31b, that includes the peripheral plating layer 31be having a large thickness and the center plating layer 31bs having a small thickness, is easily formed flat.

Figure 8:
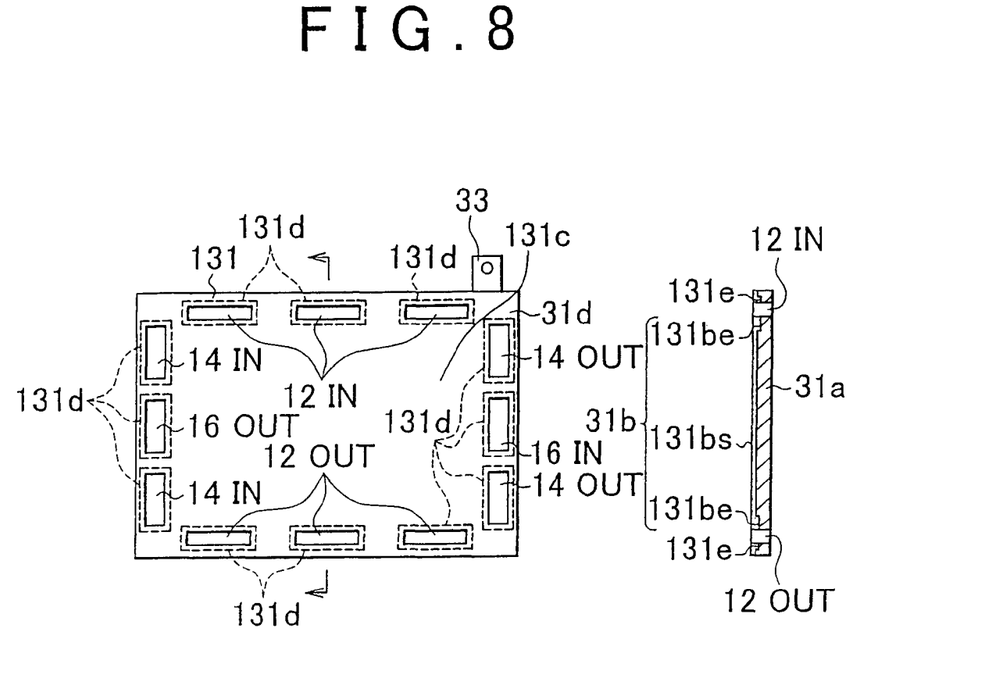
FIG. 8 corresponds to FIG. 3, showing a view of the front terminal plate of the second example embodiment seen in the direction A indicated in FIG. 2 and a cross-sectional view of the front terminal plate taken along the direction A.
Figure 9:
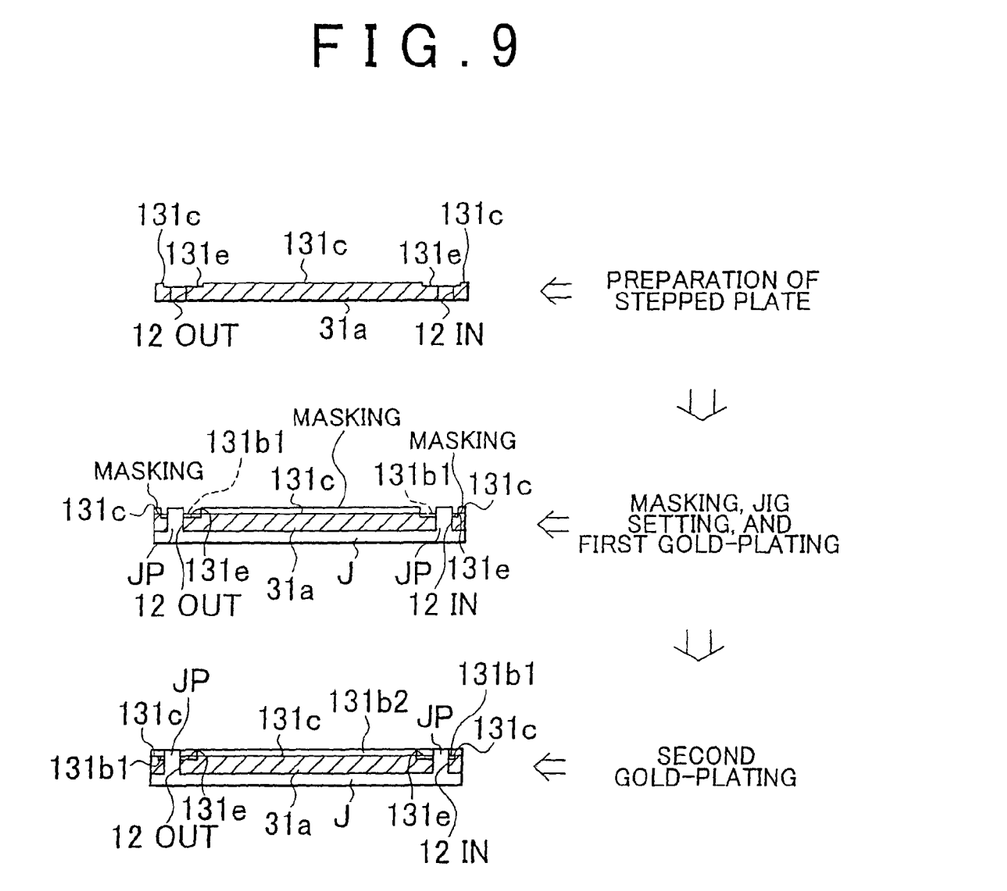
FIG. 9 corresponds to FIG. 6, illustrating manufacturing process in the procedure for manufacturing the front terminal plate.
Figure 10:
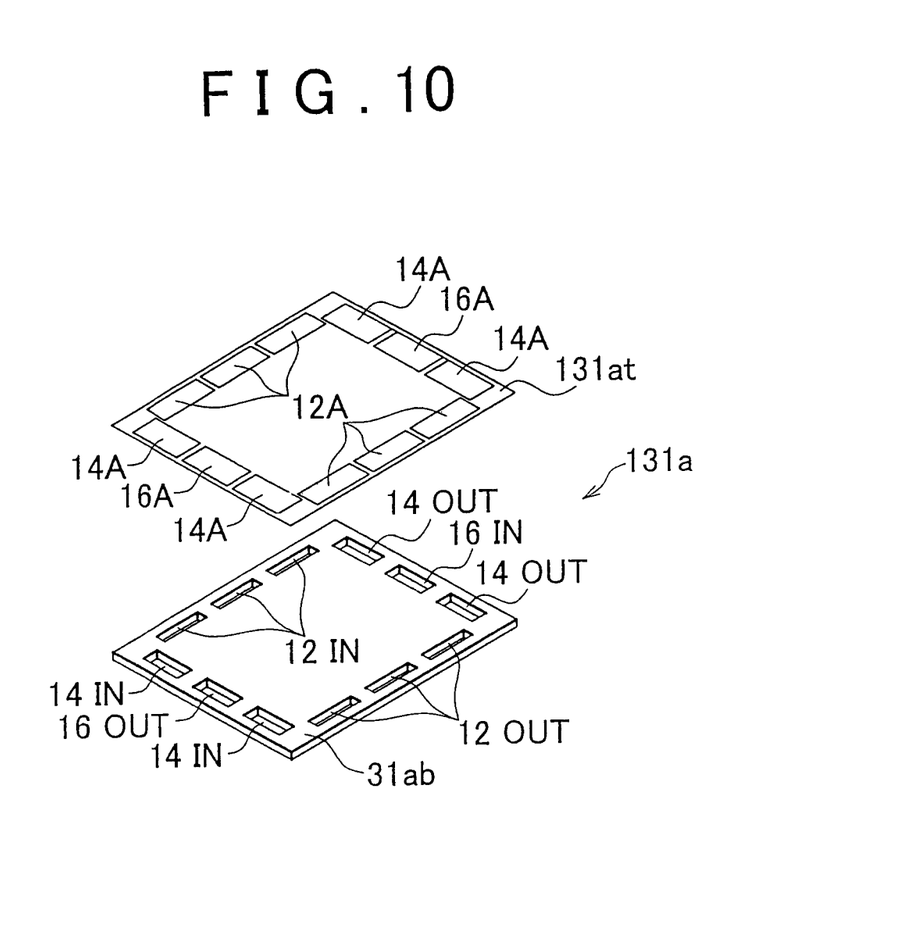
FIG. 10 corresponds to FIG. 7, illustrating an exemplary process that is performed in the manufacturing procedure to prepare plates.

Next, the second example embodiment of the invention will be described. The second example embodiment is characterized in that the thick peripheral plating layers 31be of a front terminal plate 131 are formed only at the peripheries of the openings of the air inlets 12IN, the air outlets 12OUT, and so on. FIG. 8 corresponds to FIG. 3 showing a view of the front terminal plate 131 seen in the direction A shown in FIG. 2 and a cross-sectional view of the front terminal plate 131 taken along the direction A. FIG. 9 corresponds to FIG. 6 illustrating manufacturing process in the procedure for manufacturing the front terminal plate 131, and FIG. 10 corresponds to FIG. 7 illustrating an exemplary process that is performed in the manufacturing procedure to prepare plates.

Referring to FIG. 8, like the front terminal plate 31 described above, the front terminal plate 131 has the plate 31a on which the gold-plating layer 31b is formed so as to cover the surface of the plate 31a, and the surface of the gold-plating layer 31b is flat. Although the surface of the gold-plating layer 31b is flat, the thickness of the gold-plating layer 31b is different only at opening-surrounding regions 131d surrounding the openings of the air inlets 121IN, the air outlets 121OUT, and so on. That is, the gold-plating layer 31b of the front terminal plate 131 includes opening-surrounding plating layers 131be, that are large in thickness, formed at the respective opening-surrounding regions 131d and a residual plating layer 131bs, that is small in thickness, formed at a residual region 131c, which is the region other than the opening-surrounding regions 131d. Note that the thicknesses of the opening-surrounding plating layers 131be and the residual plating layer 131bs are set as described above, and the residual plating layer 131bs includes the center plating layer 31bs described above.

The front terminal plate 131 is obtained by the procedure based on that shown in FIG. 5. In detail, referring to FIG. 9, a plate 31a having concave portions 131e formed around the openings of the air inlets 12IN, the air outlets 12OUT, and so on are first prepared. The concave portions 131e are formed by, for example, cutting or pressing the peripheries of the respective openings of the plate 31a. Alternatively, referring to FIG. 10, a thin plate 131at having openings 12A to 16A having larger cross-sectional areas than those of the respective openings of the air inlets 12IN, the air outlets 12OUT, and so on may be put on a flat plate 31ab to form the concave portions 131e around the respective openings of the air inlets 12IN, the air outlets 12OUT, and so on.

Then, the residual region 131c of the plate 31a is masked, and the jig J is set to the plate 31a. In this case, the shape of the masking sheet is identical to the shape of the thin plate 131at shown in FIG. 10. Next, the first gold-plating is applied to the plate 31a, forming first gold-plating layers 131b1 such that they fill up the respective concave portions 131e of the plate 31a. Then, the masking is removed from the plate 31a, and the second gold-plating is applied to the plate 31a, whereby a second gold-plating layer 131b2, which covers the surfaces of the first gold-plating layers 131 and the surface of the residual region 131c (i.e., the entire surface of the plate 31a), is formed. This is how the gold-plating layer 31b is formed flat, while making the thickness of the opening-surrounding regions 131d around the openings of the air inlets 12IN, 12OUT, and so on large.

According to the second example embodiment of the invention, as described above, the thickness of the gold-plating layer 31b is made thick at the opening-surrounding regions 131d, that contact the water contained in the gases and the coolant distributed to and discharged from the respective fuel cell units 40 of the fuel cell stack 40S, while achieving a high corrosion resistance at the opening-surrounding regions 131d of the gold-plating layer 31b. This further reduces the amount of gold needed for gold-plating while achieving both a low contact resistance and a high corrosion resistance.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

For example, while a solid-electrolyte membrane is used as the electrolyte membrane in the foregoing example embodiments of the invention, other electrolyte membrane (e.g., solid oxide) may be used instead of the solid-electrolyte membrane. Further, while the invention is applied to the fuel cell stack 40S constituted of the fuel cell units 40 in the foregoing example embodiments of the invention, the invention may be applied to a fuel cell 10 constituted of a single fuel cell unit 40, for example.

The invention claimed is:

1. A terminal plate joined to a fuel cell that generates power through electrochemical reaction between hydrogen and oxygen, to collect the power generated by the fuel cell, comprising:

a conductive plate having a plurality of conductive plate openings;

a thin plate disposed on the conductive plate and including a plurality of thin plate openings, wherein a thickness of the thin plate is less than a thickness of the conductive plate, and wherein cross-sectional areas of the thin plate openings are larger than cross-sectional areas of the conductive plate openings such that the thin plate defines a respective concave portion around each of the conductive plate openings; and a layer, that has a low electric resistance and a high corrosion resistance, is formed on a surface of the conductive plate via which the conductive plate is joined to the fuel cell, the surface of the layer being flat, wherein the thickness of the layer in an electrode-facing region that faces an electrode region of the fuel cell is different from the thickness of the layer in a peripheral region that surrounds the electrode-facing region, and the thickness of the layer in the peripheral region is larger than the thickness of the layer in the electrode-facing region at opening-surrounding regions surrounding respective conductive plate openings, and wherein the layer extends into the respective concave portion defined around each of the conductive plate openings.

2. The terminal plate according to claim 1, wherein:
the thickness of the conductive plate in the electrode-facing region and the thickness of the conductive plate in the peripheral region are different; and
the thickness of the conductive plate in the peripheral region is smaller than the thickness of the conductive plate in the electrode-facing region.

3. The terminal plate according to claim 2, wherein the thickness of the layer is set according to the thickness of the conductive plate so as to make the thickness of the terminal plate uniform.

4. The terminal plate according to claim 1, wherein:
the thickness of the layer in the electrode-facing region is approximately 0.5 to 4 µm; and
the thickness of the layer in the peripheral region is approximately 5 to 15 µm.

5. The terminal plate according to claim 1, wherein:
fuel gas and coolant are distributed to and discharged from the fuel cell through the conductive plate openings; and
the conductive plate openings are formed in the peripheral region of the conductive plate with the layer formed thereon.

6. The terminal plate according to claim 5, wherein the thickness of the layer in the peripheral region excluding the opening-surrounding regions and the thickness of the layer in the electrode-facing region are equal to each other.

7. The terminal plate according to claim 1, wherein the layer is formed by gold-plating.

8. A fuel cell module comprising:
a fuel cell stack constituted of a plurality of fuel cell units that generate power through electrochemical reaction between hydrogen and oxygen, stacked on top of each other;
terminal plates, that are joined to the fuel cell units at both ends of the fuel cell stack respectively, to collect power generated by the fuel cell stack; and
a clamping mechanism that clamps the fuel cell stack and the terminal plates together between a pair of end plates facing each other,
wherein each terminal plate has:
a conductive plate having a plurality of conductive plate openings;
a thin plate disposed on the conductive plate and including a plurality of thin plate openings, wherein a thickness of the thin plate is less than a thickness of the conductive plate, and wherein cross-sectional areas of the thin plate openings are larger than cross-sectional areas of the conductive plate openings such that the thin plate defines a respective concave portion around each of the conductive plate openings; and
a layer, that has a low electric resistance and a high corrosion resistance and is formed on a surface of the conductive plate via which the conductive plate is joined to the fuel cell, the surface of the layer being flat,
wherein the thickness of the layer in an electrode-facing region that faces an electrode region of the fuel cell is different from the thickness of the layer in a peripheral region that surrounds the electrode-facing region, and the thickness of the layer in the peripheral region is larger than the thickness of the layer in the electrode-facing region at opening-surrounding regions surrounding respective conductive plate openings, and wherein the layer extends into the respective concave portion defined around each of the conductive plate openings.

* * * * *